US008692765B2

(12) United States Patent
Yeh et al.

(10) Patent No.: US 8,692,765 B2
(45) Date of Patent: Apr. 8, 2014

(54) 2D/3D IMAGE SWITCHING DISPLAY DEVICE

(75) Inventors: Yu-Chou Yeh, Taoyuan County (TW);
Chao-Yi Wang, Taoyuan County (TW);
Chi-Hsien Sung, Taoyuan County (TW);
Min-Hui Chiang, Taoyuan County (TW)

(73) Assignee: J Touch Corporation, Taoyuan County (TW)

( * ) Notice: Subject to any disclaimer, the term of this patent is extended or adjusted under 35 U.S.C. 154(b) by 869 days.

(21) Appl. No.: 12/886,752

(22) Filed: Sep. 21, 2010

(65) Prior Publication Data
US 2011/0304530 A1 Dec. 15, 2011

(30) Foreign Application Priority Data

Jun. 14, 2010 (TW) ................................ 99119247 A

(51) Int. Cl.
*G09G 5/00* (2006.01)
*G09G 3/30* (2006.01)
(52) U.S. Cl.
USPC ............................................. 345/156; 345/76
(58) Field of Classification Search
USPC .................. 345/76, 77, 84, 156, 173, 178
See application file for complete search history.

(56) References Cited

U.S. PATENT DOCUMENTS 7,199,845 B2 * 4/2007 Koyama et al. .................. 349/15
7,432,892 B2 * 10/2008 Lee et al. ......................... 345/84

FOREIGN PATENT DOCUMENTS

TW M368088 11/2009
TW M371902 1/2010

* cited by examiner

*Primary Examiner* — Michael Faragalla
(74) *Attorney, Agent, or Firm* — Rosenberg, Klein & Lee

(57) ABSTRACT

A 2D/3D image switching display device includes an image display unit and an image switching unit coupled to the image display unit. The image switching unit includes first and second transparent substrates and first and second transparent conducting elements installed on the first and second transparent substrates respectively. An electrochromic layer and an electrolytic layer are formed on the first and second transparent substrates sequentially. The electrochromic layer produce a color change according to the switching status of the image display unit After a stereo image divided into left and right eye images is received by naked eyes, no moire pattern will be produced, so that no additional light shielding device using a parallax barrier is required for displaying stereo images, and the 2D/3D image switching display device can change a light-shielding angle for adjusting a stereo image display according to the viewing angle.

56 Claims, 15 Drawing Sheets

2D/3D IMAGE SWITCHING DISPLAY DEVICE

CROSS-REFERENCE TO RELATED APPLICATIONS

This non-provisional application claims priority under 35 U.S.C. §119(a) on Patent Application No(s). 099119247 filed in Taiwan, R.O.C. on Jun. 14, 2010, the entire contents of which are hereby incorporated by reference.

BACKGROUND OF THE INVENTION

1. Field of the Invention

The present invention relates to an image switching display device, and more particularly to a 2D/3D image switching display device capable of switching a 2D or 3D image display status.

2. Description of the Related Art

The principle of present well-known stereo image display technologies adopts a binocular disparity for receiving different images from both left and right eyes of a user respectively, and finally the user's brain merges the images into a stereo image. In naked-eye stereo display technologies, there are two main types of structures, respectively: lenticular lens and barrier, and these structures have advantages and disadvantages, wherein the lenticular lens includes a plurality of slender straight convex lenses arranged continuously along an axial direction to produce different views to the left and right eyes by the principle of optical refraction. Compared with the barrier, the lenticular lens makes use of the light refraction to achieve the light division effect, so that there will be less loss of light and better brightness, but the refraction occurred at edges of the lens is restricted and the refraction effect is poor, or stray light is produced due to factors such as the manufacturing discrepancy of the lenticular lens and the difficulty of leveling a lens surface, and thus blurring a portion of a stereo image and affecting the overall display effect of the 3D image. In addition, the barrier uses a whole row of obstacles to limit the emission of lights at a certain angle and allows viewing images of a certain angle to be transmitted to the left and right eyes to produce a stereo image. Compared with the lenticular lens, the single lens image is clearer, but the congenital structural characteristic will results in drawbacks such as reducing the overall brightness and the resolution of the image, etc.

In addition, the general stereo display device can display stereo images only, but cannot switch between planar images and stereo images, and the main reason resides on that after the lenticular lens or barrier is combined with the general display device, and all planar images passed through lenticular lens or barrier are distinguished as left eye images and right eye images, unless a stereo image display module is installed externally. If it is not necessary to display stereo images, the external stereo image display module is removed from the display device. However, the aforementioned application requires a precious alignment to avoid a reduced image resolution or a deviation. Therefore, manufacturers have developed a stereo image display device capable of switching the display between stereo images and planar images.

As disclosed in R.O.C. Pat. No. M371902 entitled "Display device for switching 2D planar image/3D stereo image display screen, the display device comprises a flat display device and a parallax barrier panel installed on a display surface of the flat display device, and the parallax barrier panel includes a grid pattern having a first electrochromic material layer and a second electrochromic material layer, wherein the grid pattern, the first electrochromic material layer and the second electrochromic material layer are transparent in a 2D planar image display mode, and the grid pattern is an opaque pattern, and the first electrochromic material layer has a first color, and the second electrochromic material layer has a second color in a 3D stereo image display mode.

As disclosed in R.O.C. Pat. No. M368088 entitled "Display device for switching 2D planar image/3D stereo image display screen", the display device comprises: a first substrate; a parallax barrier unit installed under the first substrate; a color filter unit installed under the parallax barrier unit; a common electrode installed under the color filter unit; a liquid crystal unit installed under the common electrode; a plurality of thin film transistors installed under the liquid crystal unit; a second substrate installed under the plurality of thin film transistors; and a light source installed under the second substrate, such that the parallax barrier unit is provided for modulating a planar image and a stereo image, reducing the thickness of the conventional display device, and lowering the assembling cost.

The foregoing two patented technologies use an electrochromic material as a parallax barrier device for displaying a stereo image, but both structures have a common drawback of missing a necessary electrolytic layer of the electrochromic device which can supply ions to an electrolytic layer of the electrochromic layer, no that the electrochromic device cannot produce a reversible reaction of oxidation or reduction to complete a coloring or discoloring change, and the foregoing two patented technologies are not feasible. In addition, both transparent electrode layer and electrochromic material layer of the parallax barrier device come with a grid pattern and require a complicated manufacturing processes including layer coating, sputtering or etching to achieve the precise alignment of each layer. Furthermore, all layers include a grid pattern, and thus a hollow area is formed between the grids, and the hollow area will affect the overall penetration, refraction or reflection of the light. Even for a general 2D display, the image quality of the display device may be affected, and the chromic aberration or the brightness uniformity may be resulted. In R.O.C. Pat. No. N4368088, another structure for implanting a substrate of the liquid display device is implanted into an insulating transparent material by the grid pattern, and thus the thickness of the stereo image liquid display device can be reduced, but the manufacturing process will be very complicated.

Although the foregoing patented technologies can switch the planar and stereo display, yet these technologies cannot change the angle of the stereo display for a handheld device that provides a flexible viewing angle, and thus users have to view the 3D image from a specific direction.

SUMMARY OF THE INVENTION

In view of the foregoing requirements, the inventor of the present invention based on years of experience in the related industry to conduct extensive researches and experiments, and finally developed a novel 2D/3D image switching display device.

Therefore, it is an objective of the invention to provide a 2D/3D image switching display device with the effect of switching a 2D image or 3D image display status.

It is an objective of the present invention to provide a 2D/3D image switching display device for performing a 2D/3D image display without requiring the installation of an additional parallax barrier device.

Another objective of the present invention is to provide a 2D/3D image switching display device that will not affect the image resolution when displaying a planar image.

Another objective of the present invention is to provide a 2D/3D image switching display device that can simplify the manufacturing process.

Another objective of the present invention is to provide a 2D/3D image switching display device that can change a light-shielding angle for adjusting a stereo image display according to the viewing angle.

To achieve the aforementioned objective, the present invention provides a 2D/3D image switching display device, comprising: an image display unit, for displaying a planar image and a stereo image, and an image switching unit installed on a surface of the image display unit, and having a first transparent substrate and a second transparent substrate corresponding to each other, a first transparent conducting element and a second transparent conducting element installed on the transparent substrates corresponding to each other respectively, and another surface of the second transparent substrate being combined with a surface of the image display unit, and a plurality of electrochromic layers arrange with an interval apart from each other and an electrolytic layer formed sequentially under the first transparent substrate, and the electrochromic layers being provided for producing a color change according to the electric conduction of the first and second transparent conducting elements.

To achieve a good shielding effect for a color change of the electrochromic layer, the plurality of first electrochromic layers and second electrochromic layers arranged with an interval apart from each other can be installed on both sides of the electrolytic layer, and the first and second electrochromic layers are arranged in the same direction or come with a simplified stack structure, and thus the electrolytic layer can be substituted by the second electrochromic layer, and the second electrochromic layers concurrently provide the functions of complementing colors and supplying ions.

The image display unit is changed from a status of displaying a planar image into a status of displaying a stereo image, and the displayed image is divided into a left eye image and a right eye image. Now, the transparent conducting elements are electrically conducted, such that the color of the electrochromic layer is changed from transparent to an opaque dark color, and a plurality of photomask areas arranged with an interval apart from each other are formed on the electrochromic layer according to the condition of the electrochromic layers arranged with an interval apart from each other, and an overlapped image portion of a stereo image divided into a left eye image and a right eye image overlapped image area is eliminated by the photomask areas. Therefore, a moire pattern will not be produced after the naked eyes receive the left and right eye images. In addition, a stereo image display generally requires an additional installation of a lenticular lens or a barrier on the display unit. In the 2D/3D image switching display device of the present invention, the display unit is used directly for displaying the stereo image divided into the left eye image and the right eye image, when a stereo image is displayed.

It is noteworthy to point out that the stacking sequence of the electrochromic layer and the electrolytic layer in the electrochromic structure can be switched without affecting the color changing mechanism of the electrochromic layer, and provided for controlling an applied voltage to conduct an oxidation or a reduction of the electrochromic layer. In the present invention, the electrochromic layers arranged with an interval apart from each other and the transparent conducting element does not come with a plurality that are not arranged with an interval apart from each other, or only one of the stack layers arranged with an interval apart from each other is formed on the same substrate during a manufacturing process in order to overcome the alignment issue of each stack layer and simplify the manufacturing process.

By combining two sets of electrochromic devices, performing a sensing action through the sensing element, and switching a circuit of the control element, the present invention allows a viewer to view a stereo image from different directions of the device when the viewer turns the device to switch the light-shielding angle of the parallax barrier device correspondingly.

DETAILED DESCRIPTION OF THE PREFERRED EMBODIMENTS

Figure 1:
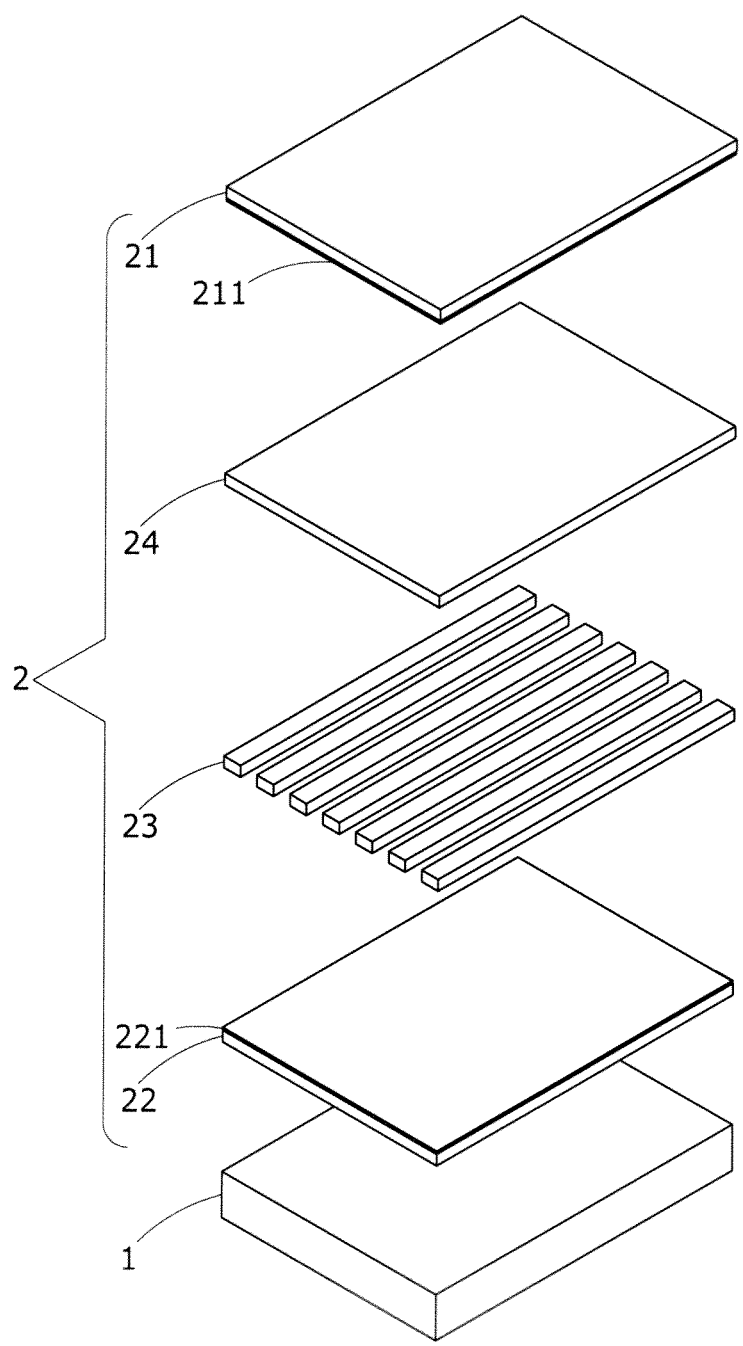
FIG. 1 is a perspective exploded view of a first preferred embodiment of the present invention.
Figure 2:
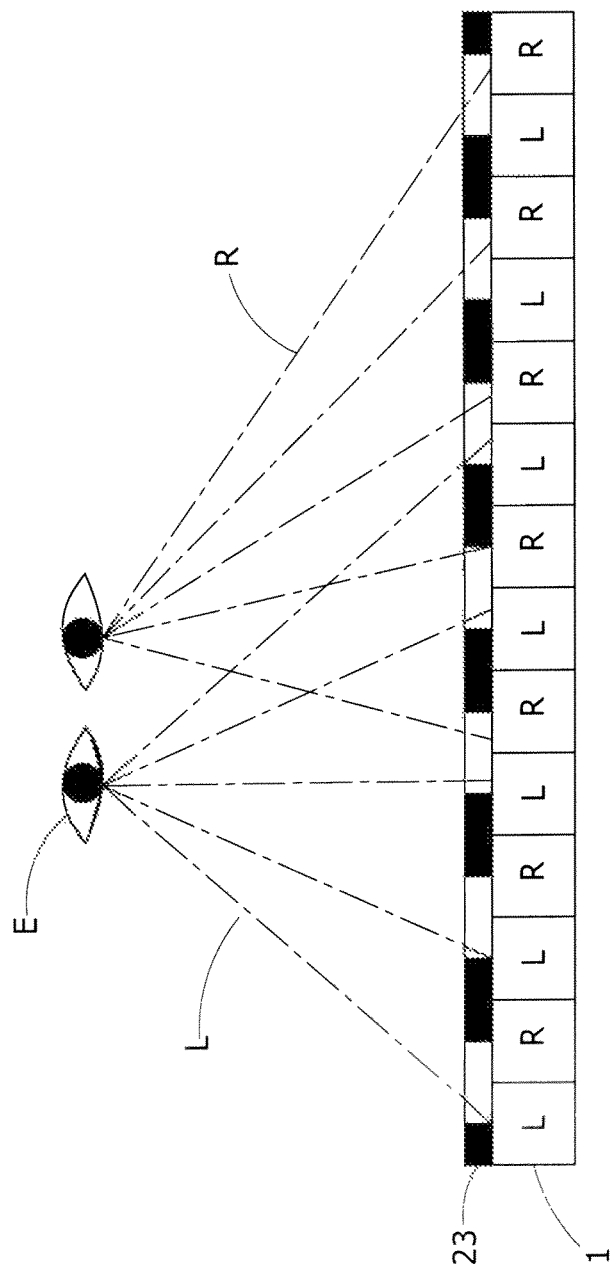
FIG. 2 is a first schematic view of movements in accordance with a first preferred embodiment of the present invention.

The technical characteristics of the present invention will become apparent with the detailed description of preferred embodiments and the illustration of related drawings as follows.

With reference to FIGS. 1 to 4 for a perspective exploded view and schematic views of movements of a 2D/3D image switching display device in accordance with a first preferred embodiment of the present invention respectively, the 2D/3D image switching display device comprises an image display unit 1 and an image switching unit 2.

The image display unit 1 is provided for displaying a planar image and a stereo image, and the displayed stereo image can be produced by software, firmware or hardware. For example, a software or firmware is used for converting the planar image into a superimposed image consisting of a left eye image and a right eye image, or a hardware device such as a lenticular lens or a barrier can divided an image into a left eye image and a right eye image, but such stereo image display technology is not the technical characteristic of the present invention, and it is a prior art disclosed earlier, and thus will not be described here. In addition, the display unit 1 is a liquid crystal display (LCD), a plasma display panel (PDP), a surface conduction electron-emitter display (SED), a field emission display (FED), a vacuum fluorescent display (VFD), an organic light-emitting diode (OLED) or an electronic paper (e-Paper).

The image switching unit 2 is combined onto a surface of the image display unit 1 and includes a first transparent substrate 21, a second transparent substrate 22, an electrochromic layer 23 and an electrolytic layer 24.

The first transparent substrate 21 includes a first transparent conducting element 211, which is in form of a slab, a thin slice or a membrane formed on a lower surface of the first transparent substrate 21, and the first transparent substrate 21 and the second transparent substrate 22 are made of plastic, polymer plastic, glass, or a material selected from resin, polyethylene terephthalate (PET), polycarbonate (PC), polyethylene (PE), polyvinyl chloride (PVC), poly propylene (PP), polystyrene (PS), polymethylmethacrylate (PMMA) or their mixtures, and the first transparent conducting element 211 and the second transparent conducting elements 221 are made of an impurity-doped oxide selected from indium tin oxide (ITO), indium zinc oxide (IZO), Al-doped ZnO, (AZO) or antimony tin oxide (ATO).

The electrochromic layers 23 are arranged with an interval apart from each other and above the second transparent substrate 22, and covered on a surface of the second transparent conducting element 221 by a sol-gel method, a sputtering method, a plating method, a screen printing method, a coating method, a anodizing method, a photopolymerization method, or a laser etching method, etc. The electrochromic layer 23 is made of an anodic coloration transition metal oxide, a cathodic coloration transition metal oxide, a cathodic/anodic coloration transition metal oxide or organic compounds. In general, the anodic coloration material is selected from chromium oxide ($Cr_2O_3$), nickel oxide (NiOx), Iridium oxide ($IrO_2$), manganese oxide ($MnO_2$), ferric ferrocyanide $Fe_4[Fe(CN)_6]_3$ or nickel hydroxide $Ni(OH)_2$, and the cathodic coloration material is selected from tungsten oxide ($WO_3$), molybdenum oxide ($MoO_3$), niobium oxide ($Nb_2O_3$), titanium oxide ($TiO_2$), or strontium titanium oxide ($SrTiO_3$), and the cathodic/anodic coloration material is selected from tantalum pentoxide ($V_2O_5$), rhodium oxide ($Rh_2O_3$) or cobalt oxide ($CoO_x$), or a transition metal oxide such as tantalum pentoxide ($Ta_2O_5$) used as a solid electrolyte or an ionic conducting layer.

Different transition metal oxides are different types of electrochromic materials, and the common ones are listed in the following table:

| | Transition metal oxide | Oxidized State | Reduced State |
|---|---|---|---|
| Reduced State Coloration (cathodic coloration) | $WO_3$ | Transparent | Blue |
| | $MoO_3$ | Transparent | Blue |
| | $Nb_2O_3$ | Transparent | Blue |
| | $TiO_2$ | Transparent | Dark Blue/Dark Green |
| Oxidized State Coloration (anodic coloration) | $NiO_x$ | Dark Bronze | Transparent |
| | $IrO_2$ | Black | Transparent |
| | $Ni(OH)_2$ | Brown | Light Yellow |
| | $Fe[Fe(CN)_6]_3$ | Dark Blue | Transparent |
| Oxidized State/Reduced State Coloration (cathodic/anodic coloration) | $V_2O_5$ | Grey | Yellow |
| | $CoO_x$ | Red | Blue |
| | $Rh_2O_3$ | Yellow | Green |

The electrolytic layer 24 is disposed between the electrochromic layer 23 and the first transparent substrate 21 primarily for supplying and conducting ions to the electrochromic layer 23, and the electrolytic layer 24 can be a liquid or solid electrolyte, but the liquid electrolyte may have a leakage issue of a component package, so that the solid electrolyte is usually used. In a preferred embodiment of the present invention, the electrolytic layer 24 is a solid electrolyte, preferably a proton exchange membrane, which can be an ionomer membrane, an organic-inorganic hybrid membrane or a membrane based on polymer and oxo-acids, wherein the ionomer membrane can be a polymerized perfluorosulfonic acid (PFSA) membrane. In another preferred embodiment of the present invention, the electrolytic layer 24 is a liquid electrolyte selected from lithium perchlorate ($LiClO_4$), potassium hydroxide (KOH), sodium hydroxide (NaOH) and sodium silicate ($Na_2SiO_3$).

Figure 3:
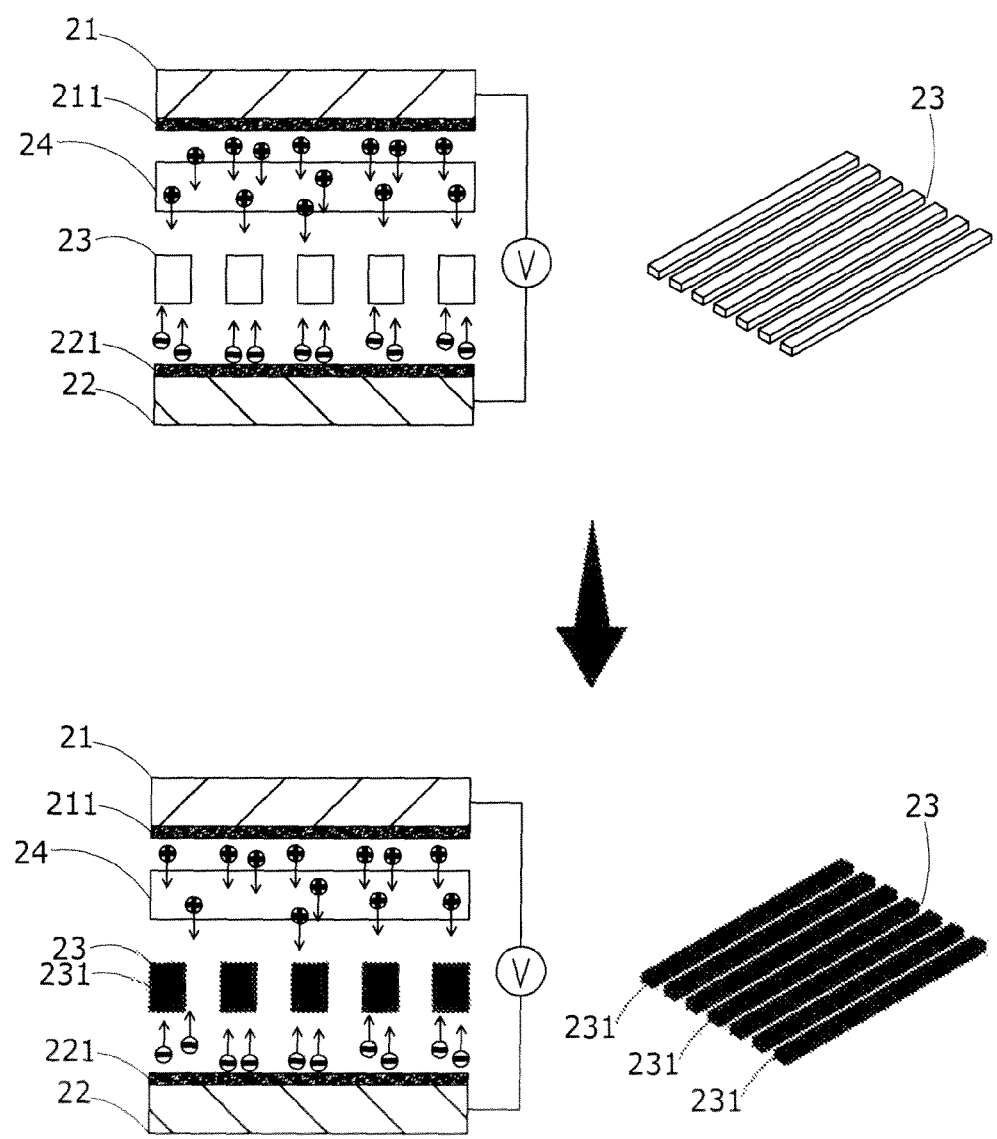
FIG. 3 is a second schematic view of movements in accordance with a first preferred embodiment of the present invention.

The electrochromic materials of this sort refer to materials that produce a reversible reaction of oxidation or reduction to cause a color change after an electric potential is applied. The principle of operating the electrochromic layer 23 origins from a change of valence of transition metal ions in the electrochromic material that causes colorations and discolorations. If a bias voltage is applied to the electrochromic layer 23, the ions originally stored in the electrolytic layer 24 will be dispersed and moved to the electrochromic layer 23, while the electrons are being injected into the electrochromic layer 23 through the first transparent conducting element 221 to maintain the color changing layer electrically neutral. After the electrons and ions are injected into the electrochromic layer 23, the oxidized/reduced state of the material of the electrochromic layer 23 will be changed gradually, such that the refractive index and penetration rate of the electrochromic layer 23 will be changed accordingly. The coloration process can be completed in several seconds to one minute, and thus the electrochromic layer 23 as shown in FIG. 3 is changed from transparent to a colored state to form an opaque photomask area 231. After the bias voltage applied to the electrochromic layer 23 disappears, the state of the electrochromic layer 23 is changed from the colored state to a transparent state, and this process is referred to as an anodic coloration.

Figure 4:
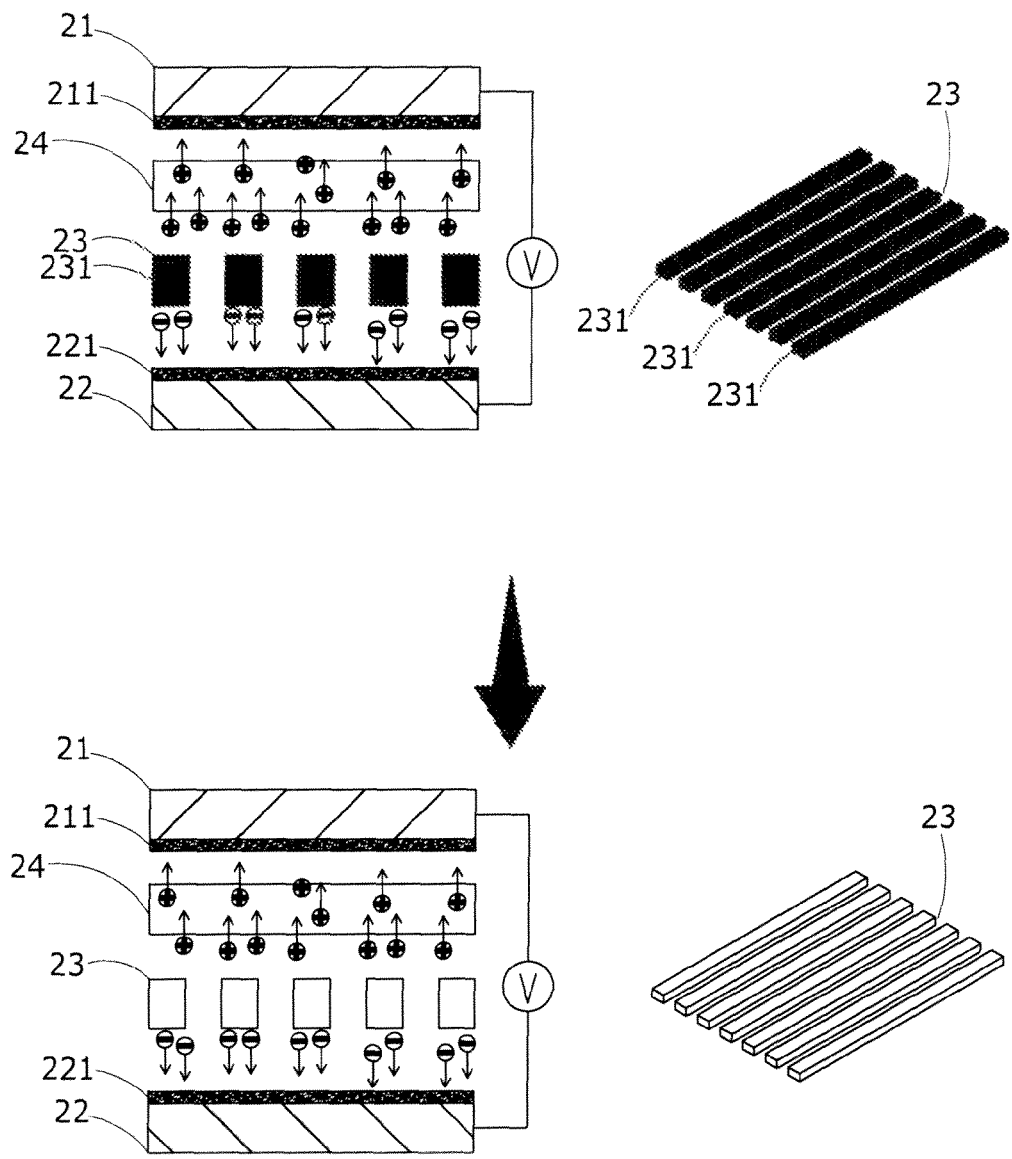
FIG. 4 is a third schematic view of movements in accordance with the first preferred embodiment of the present invention.

On the other hand, if a reverse voltage or a zero bias voltage is applied to the electrochromic layer 23, ions are returned along an opposite path from the electrochromic layer 23 to the electrolytic layer 24, and then the electrochromic layer 23 is reduced to its original colorless state, and this process is referred to as a discoloration process. In FIG. 4, the opaque photomask area 231 of the electrochromic layer 23 is changed from the colored state to the transparent state. After the bias voltage applied to the electrochromic layer 23 disappears, the electrochromic layer 23 is changed from the transparent state to the colored state to restore the opaque photomask area 231, and this process is referred to as a cathodic coloration.

Since the electrochromic layers 23 are arranged with an interval apart from each other and disposed on an upper surface of the second transparent substrate 22, and the electrochromic layer 23 is disposed on the second transparent conducting elements 221, therefore after the first transparent conducting element 211 and the second transparent conducting elements 221 are electrically conducted, the electrochromic layers 23 have a color change, so as to produce a plurality of opaque photomask areas 231 arranged with an interval apart from each other. When the image display unit 1 displays a processed multi-image (divided into a left eye image L and a right eye image R), the portion of an overlapped image is eliminated by the photomask areas 231, such that the image received by naked eyes will not have a moire pattern. In addition, the additional installation of both lenticular lens and barrier to the display unit is required for the display of stereo images in conventional design, but the 2D/3D image switching display device of the present invention can directly display the stereo image divided into the left eye image and the right eye image from the display unit.

Figure 5:
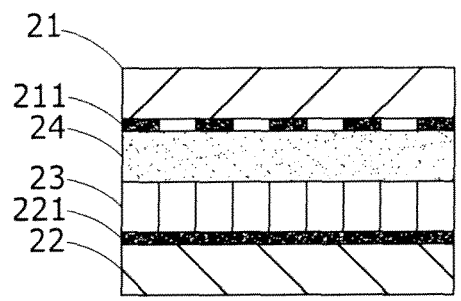
FIG. 5 is a first schematic view of a superimposed assembly with different layers in accordance with the first preferred embodiment of the present invention.
Figure 6:
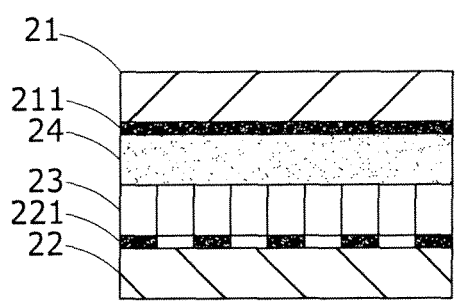
FIG. 6 is a second schematic view of a superimposed assembly with different layers in accordance with the first preferred embodiment of the present invention.
Figure 7:
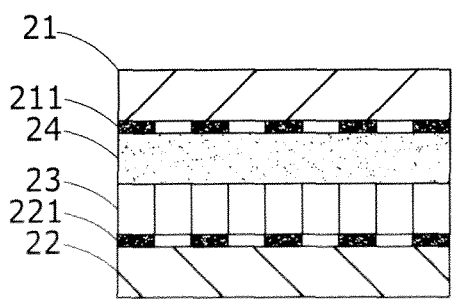
FIG. 7 is a third schematic view of a superimposed assembly with different layers in accordance with the first preferred embodiment of the present invention.

With reference to FIGS. 5 to 7 for views of different superimpositions in accordance with a first preferred embodiment of the present invention, a plurality of first transparent conducting elements 211 are arranged with an interval apart from each other and disposed on a lower surface of the first transparent substrate 21, or a plurality of second transparent conducting elements 221 are arranged with an interval apart from each other and disposed on an upper surface of the second transparent substrate 22, or a plurality of first and second transparent conducting elements 211, 221 are arranged with an interval apart from each other and disposed on surfaces of the first and second transparent substrates 21, 22, and the arrangement direction is in the same arrangement direction of the electrochromic layer 23, and the aforementioned structures are variations of the first preferred embodiment with a simplified manufacturing process. Preferably, a plurality of electrochromic layers 23 are arranged with an interval apart from each other and disposed in the layered structures to achieve good color changing mechanism and light shielding effect.

Figure 8:
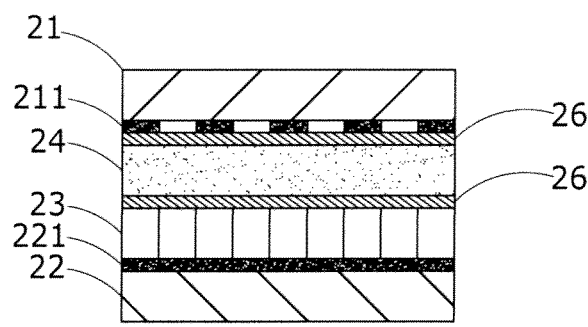
FIG. 8 is a fourth schematic view of a superimposed assembly with different layers in accordance with the first preferred embodiment of the present invention.
Figure 9:
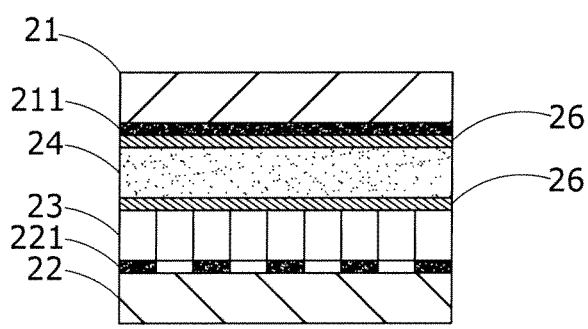
FIG. 9 is a fifth schematic view of a superimposed assembly with different layers in accordance with the first preferred embodiment of the present invention.
Figure 10:
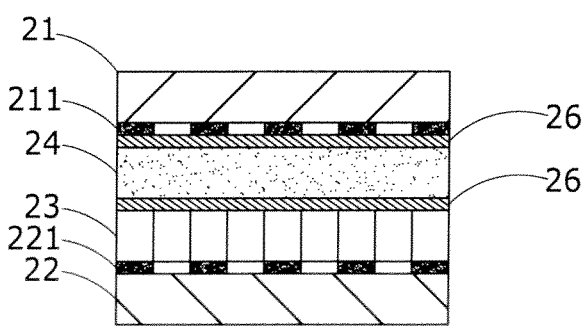
FIG. 10 is a sixth schematic view of a superimposed assembly with different layers in accordance with the first preferred embodiment of the present invention.

With reference to FIGS. 8 to 10, in addition, in order to protect the first transparent conducting elements 211 from being corroded by the electrolyte, a protective layer 26 is provided and disposed between the first transparent conducting elements 211 and the electrolytic layer 24. Furthermore, in order to avoid hydrolysis and increase the service life of the electrochromic layers 23, a protective layer 26 is provided and disposed between electrochromic layers 23 and the electrolytic layer 24. The protective layer is made of a material selected from the collection of silicon dioxide ($SiO_2$), aluminum oxide ($Al_2O_3$), tetramethyldisiloxane (TMDSO, $C_4H_{14}OSi_2$), or other carbon-silicon-oxide layer, and disposed in layers by a sputtering method or a plating method.

Figure 11:
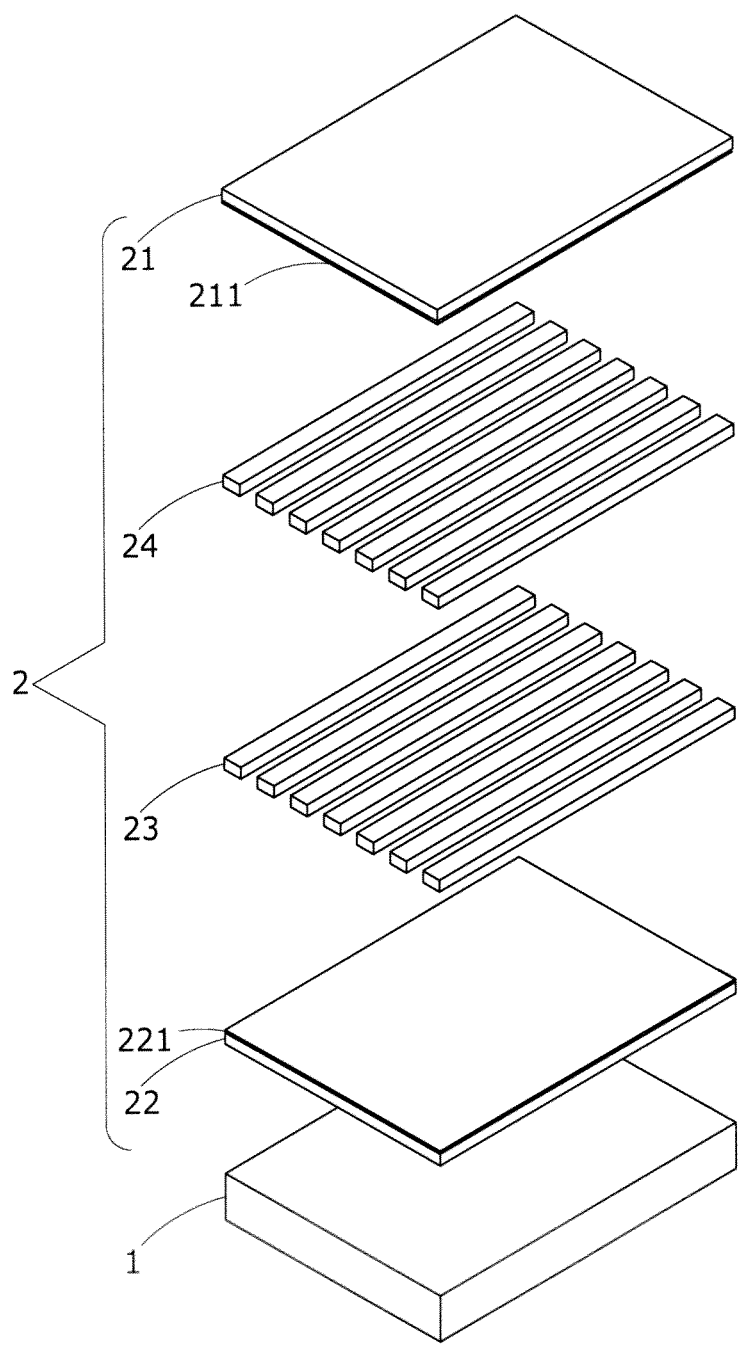
FIG. 11 is a perspective exploded view of a second preferred embodiment of the present invention.

With reference to FIG. 11 for an exploded view of a second preferred embodiment of the present invention, the difference between this preferred embodiment with the first preferred embodiment resides on that a plurality of electrolytic layers 24 are arranged with an interval apart from each other and disposed between the first transparent substrate 21 and the electrochromic layer 23, but a preferred application of such electrolytic layers 24 is to use the electrolytic layers 24 for the complementary coloration function of the electrochromic layer 23 to increase the contrast of the penetration rate effectively. In other words, the electrolytic layer can be made of an electrochromic material selected from an anodic coloration transition metal oxide, a cathodic coloration transition metal oxide or a cathodic/anodic coloration transition metal oxide or organic compounds. In general, the anodic coloration material is selected from chromium oxide ($Cr_2O_3$), nickel oxide ($NiO_x$), Iridium oxide ($IrO_2$), manganese oxide ($MnO_2$), ferric ferrocyanide $Fe_4[Fe(CN)_6]_3$ or nickel hydroxide $Ni(OH)_2$, and the cathodic coloration material is selected from tungsten oxide ($WO_3$), molybdenum oxide ($MoO_3$), niobium oxide ($Nb_2O_3$), titanium oxide ($TiO_2$) or strontium titanium oxide ($SrTiO_3$), and the cathodic/anodic coloration material is selected from vanadium pentoxide ($V_2O_5$), rhodium oxide ($Rh_2O_3$) or cobalt oxide ($CoOx$), or a transition metal oxide such as tantalum pentoxide ($Ta_2O_5$) used as a solid electrolyte or an ionic conducting layer. If the electrolytic layer 24 is used as a complementary layer, and the electrochromic layer 23 is made of a cathodic coloration material, then the complementary layer should be made of an anodic coloration material, and vice versa, so that when the electrochromic layer 23 is colored, the complementary layer is also colored. When the electrochromic layer 23 is discolored, the complementary layer is discolored as well.

Figure 12:
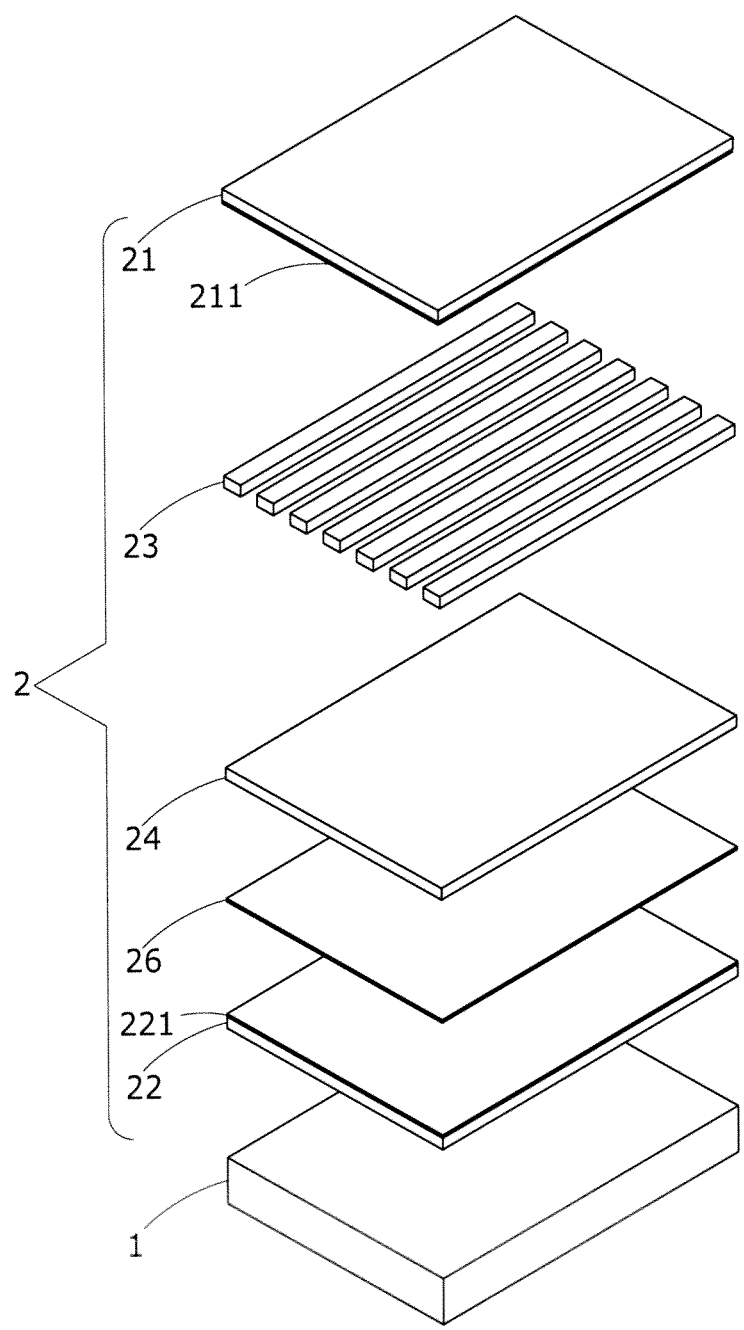
FIG. 12 is a perspective exploded view of a third preferred embodiment of the present invention.

With reference to FIG. 12 for an exploded view of a third preferred embodiment of the present invention, the difference between this preferred embodiment and the first preferred embodiment resides on that the installation positions of the electrochromic layer 23 and the electrolytic layer 24 are switched, but the effects and properties of the structures are the same as those of the first preferred embodiment, and thus will not be described here again.

Figure 13:
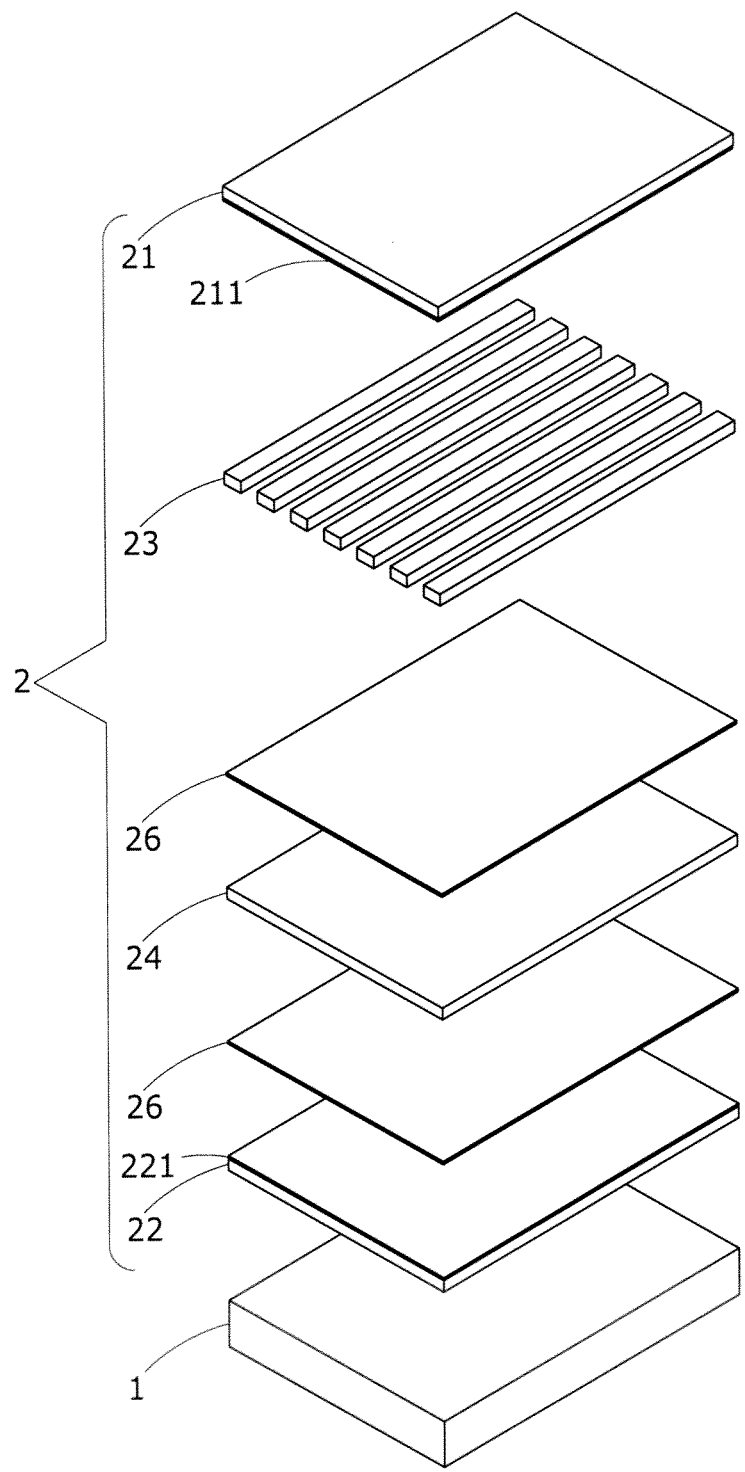
FIG. 13 is a perspective exploded view of a third preferred embodiment of the present invention with protective layers.

With reference to FIG. 13, in addition, in order to protect the second transparent conducting elements 221 from being corroded by the electrolyte, a protective layer 26 is provided and disposed between the second transparent conducting elements 221 and the electrolytic layer 24. Furthermore, in order to avoid hydrolysis and increase the service life of the electrochromic layers 23, a protective layer 26 is provided and disposed between electrochromic layers 23 and the electrolytic layer 24. The protective layer is made of a material selected from the collection of silicon dioxide ($SiO_2$), aluminum oxide ($Al_2O_3$), tetramethyldisiloxane (TMDSO, $C_4H_{14}OSi_2$), or other carbon-silicon-oxide layer, and disposed in layers by a sputtering method or a plating method.

Figure 14:
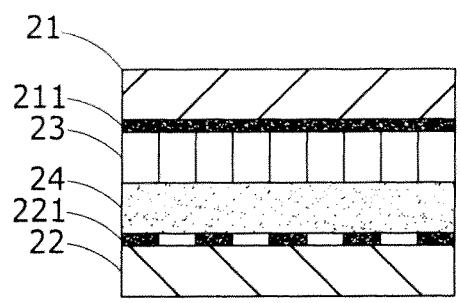
FIG. 14 is a first schematic view of a superimposed assembly with different layers in accordance with the third preferred embodiment of the present invention.
Figure 15:
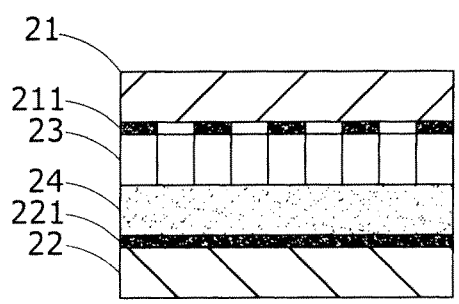
FIG. 15 is a second schematic view of a superimposed assembly with different layers in accordance with the third preferred embodiment of the present invention.
Figure 16:
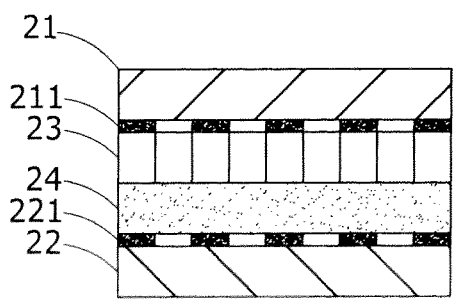
FIG. 16 is a third schematic view of a superimposed assembly with different layers in accordance with the third preferred embodiment of the present invention.

With reference to FIGS. 14 to 16 for perspective views of different superimpositions in accordance with a third preferred embodiment of the present invention respectively, a plurality of first transparent conducting element 211 are arranged with an interval apart from each other and disposed on a lower surface of the first transparent substrate 21, or a plurality of second transparent conducting elements 221 are arranged with an interval apart from each other and disposed on an upper surface of the second transparent substrate 22, or a plurality of first and second transparent conducting elements 211, 221 are arranged with an interval apart from each other and disposed on surfaces of the first and second transparent substrates 21, 22, and the arrangement direction is the same as the arrangement direction of the electrochromic layer 23.

Figure 17:
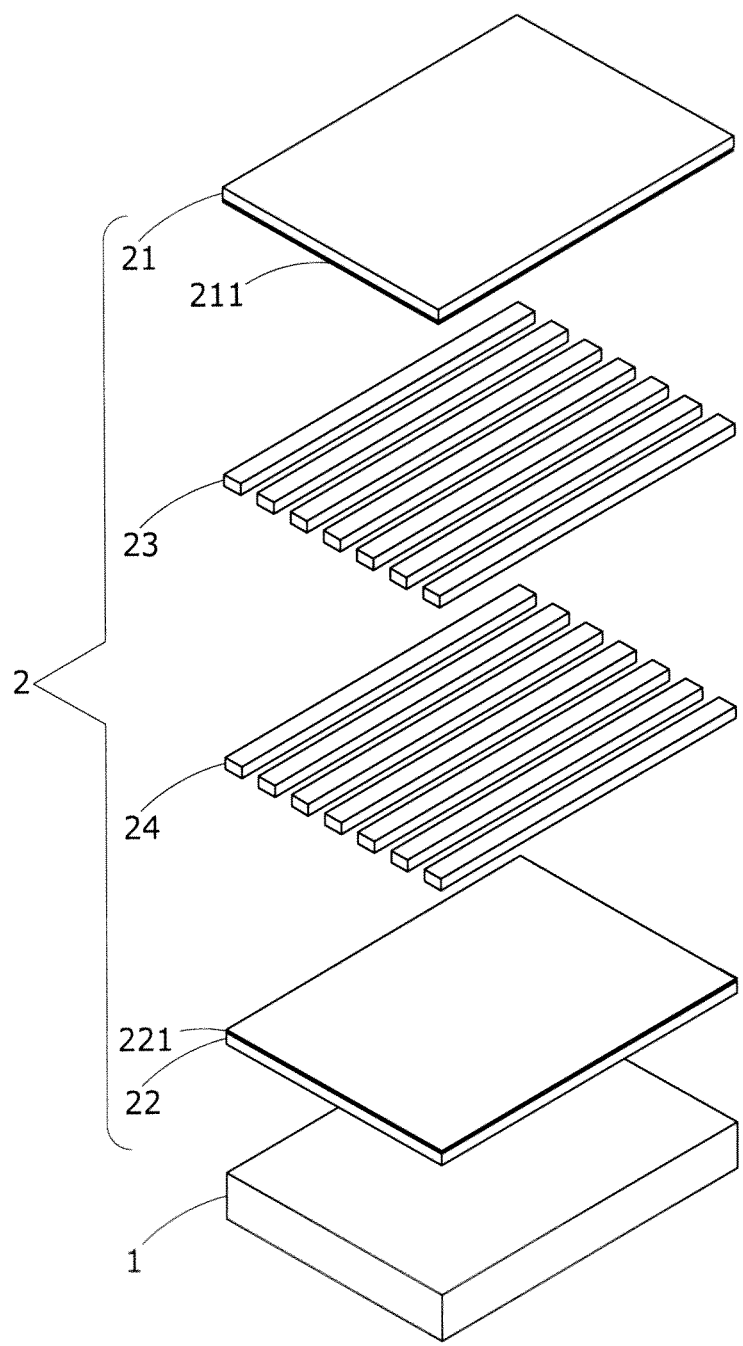
FIG. 17 is a perspective exploded view of a fourth preferred embodiment of the present invention.

With reference to FIG. 17 for an exploded view of a fourth preferred embodiment of the present invention, a plurality of electrolytic layers 24 are arranged with an interval apart from each other and disposed between the second transparent substrate 22 and the electrochromic layer 23, but a preferred application of such electrolytic layers 24 is to use the electrolytic layers 24 for the complementary coloration function of the electrochromic layer 23 to increase the contrast of the penetration rate effectively. In other words, the electrolytic layer can be made of an electrochromic material. Compared with the third preferred embodiment that switches the position of the electrolytic layer 24 and the electrochromic layer 23, the same effect and properties of the structures as those of the second preferred embodiment can be achieved, and thus will not be described here again.

Figure 18:
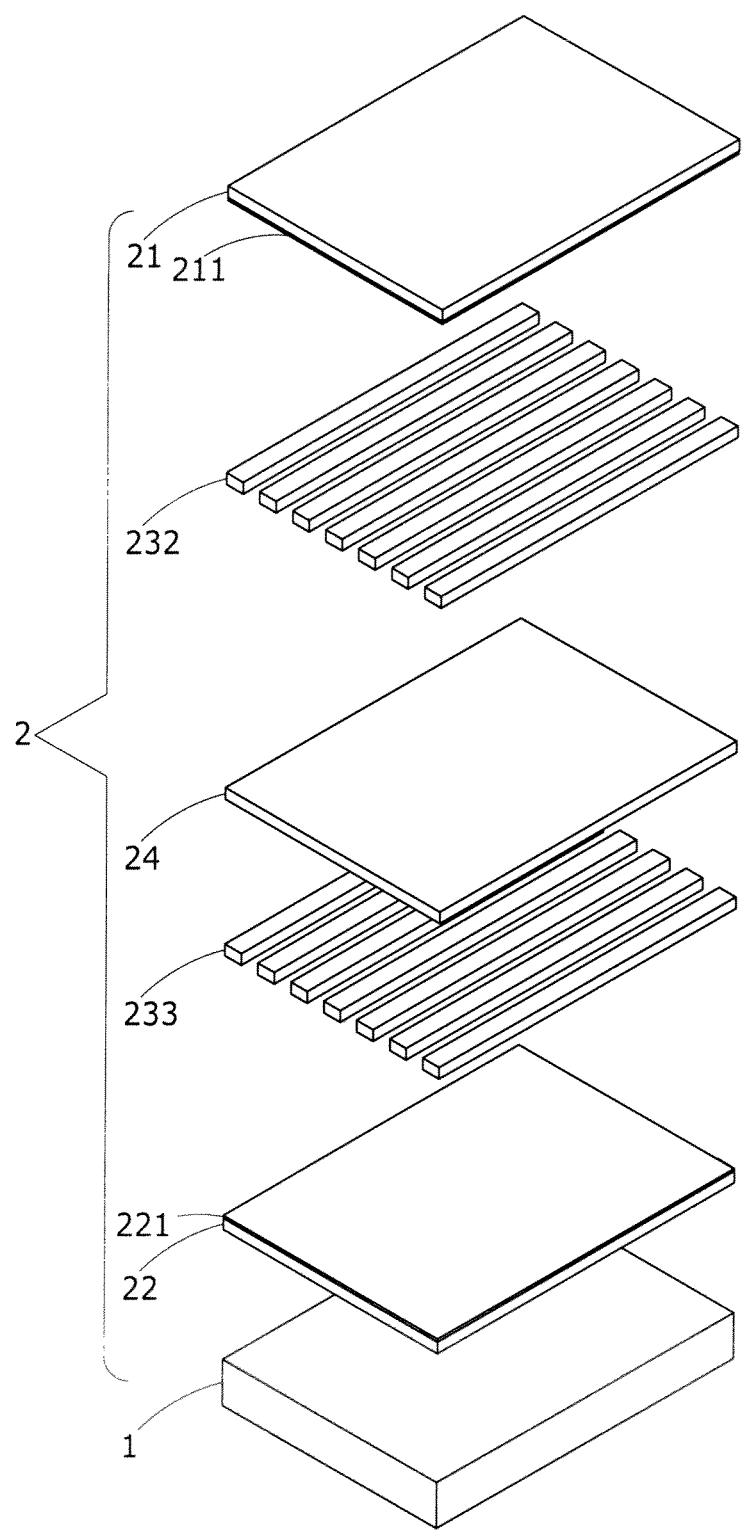
FIG. 18 is a perspective exploded view of a fifth preferred embodiment of the present invention.

With reference to FIG. 18 for an exploded view of a fifth preferred embodiment of the present invention, the difference between this preferred embodiment and the aforementioned first to fourth preferred embodiment for improving the light shielding effect resides on that this preferred embodiment adds another electrochromic layer, and its structure comprises: an image display unit 1, for displaying a planar image and a stereo image; an image switching unit 2, coupled to a surface of the image display unit 1, and including a first transparent substrate 21, whose surface has a first transparent conducting element 211, a second transparent substrate 22, and a second transparent conducting element 221 installed on a surface corresponding to the first transparent substrate 21, and another surface being provided for coupling a surface of the image display unit 1, a plurality of first electrochromic layers 232 arranged with an interval apart from each other and disposed on a lower surface of the first transparent substrate 21, and a plurality of second electrochromic layers 233 arranged with an interval apart from each other and disposed on an upper surface of the second transparent substrate 22, an electrolytic layer 24, disposed between the first electrochromic layers 232 and the second electrochromic layers 233, wherein the first electrochromic layers 232 and the second electrochromic layers 233 are disposed in the same arrangement direction, for driving the first and second electrochromic layers 232, 233 to produce a color change according to an electric conduction of the first and second transparent conducting elements 211, 221. In other words, if the first electrochromic layers 232 are colored, the second electrochromic layers 233 will also be colored, and if the first electrochromic layers 232 are discolored, the second electrochromic layers 233 will also be discolored. It is noteworthy to point out that if the first electrochromic layers 232 are made of a cathodic coloration material, the second electrochromic layer 233 should be made of an anodic coloration material, and vice versa to achieve the same effects and properties of each structure, and the structures are the same as the aforementioned preferred embodiments, and thus will not be described here again.

Figure 19:
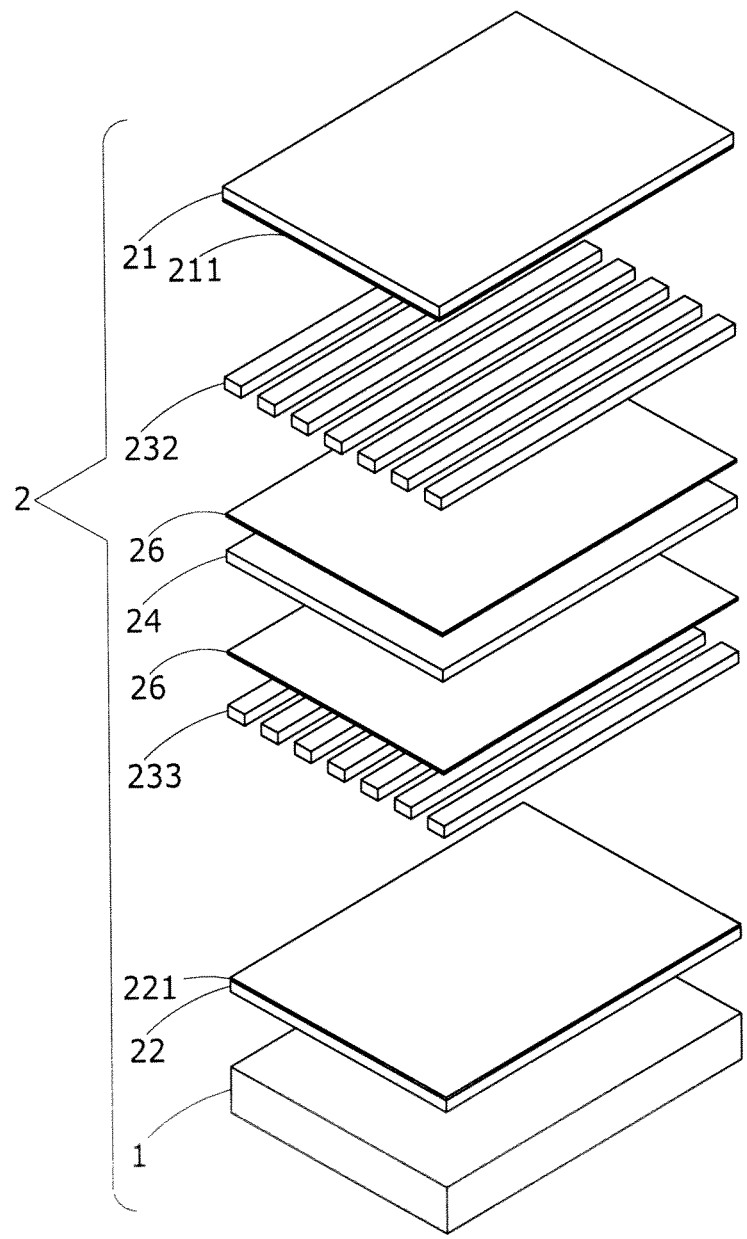
FIG. 19 is a perspective exploded view of a fifth preferred embodiment of the present invention with protective layers.

With reference to FIG. 19, in addition, in order to avoid hydrolysis and increase service life of the electrochromic layers 232, 233, a protective layer 26 is provided and disposed between the first electrochromic layer 232 and the electrolytic layer 24, and between the second electrochromic layer 233 and the electrolytic layer 24. The protective layer is made of a material selected from the collection of silicon dioxide ($SiO_2$), aluminum oxide ($Al_2O_3$), tetramethyldisiloxane (TMDSO, $C_4H_{14}OSi_2$), or other carbon-silicon-oxide layer, and disposed in layers by a sputtering method or a plating method.

Figure 20:
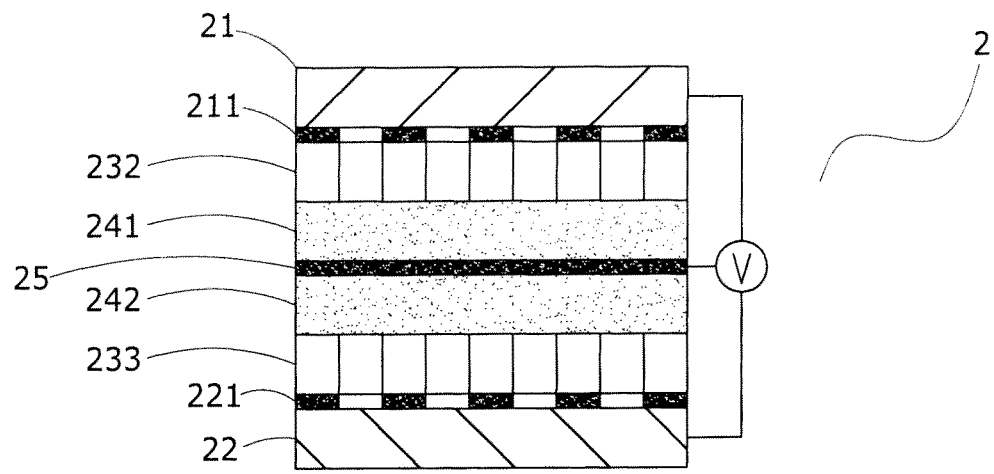
FIG. 20 is a perspective exploded view of a sixth preferred embodiment of the present invention.

With reference to FIG. 20 for the present invention for an exploded view of a sixth preferred embodiment of the present invention, the 2D/3D image switching display device of the present invention comprises an image display unit 1 and an image switching unit 2, and the image switching unit 2 comprises: a first transparent substrate 21, a second transparent substrate 22, a first electrochromic layer 232, a first electrolytic layer 241, a second electrochromic layer 233, a second electrolytic layer 242 and a third transparent conducting layer 25, wherein a first transparent conducting element 211 is installed on a lower surface of the first transparent substrate 21 and a second transparent conducting element 221 is installed on an upper surface of the second transparent substrate 22, and the plurality of first electrochromic layers 232 are disposed in a first arrangement direction, arranged with an interval apart from each other, installed on a lower surface of the first transparent substrate 21, and covered onto the first transparent conducting element 211. The first electrolytic layer 241 is disposed on a lower surface of the first electrochromic layer 232, and the plurality of second electrochromic layers 233 are disposed in a second arrangement direction, arranged with an interval apart from each other, installed on an upper surface of the second transparent substrate 22, and covered onto the second transparent conducting element 221, and the second electrolytic layer 242 is disposed on an upper surface of the second electrochromic layer 233. In addition, the third transparent conducting layer 25 is disposed between the first electrolytic layer 241 and the second electrolytic layer 242 and provided for electrically coupling the first transparent conducting element 211 and the second transparent conducting element 221, so that the first electrochromic layer 232 can produce a color change according to an electric conduction of the first transparent conducting element 211 and the third transparent conducting layer 25, and the second electrochromic layer 233 produces a color change according to an electric conduction of the second transparent conducting element 221 and the third transparent conducting layer 25.

The aforementioned first and second electrochromic layers 232, 233 of the aforementioned preferred embodiment are formed on each substrate by a sol-gel method, a sputtering method, a screen printing method, a coating method, a anodizing method, a photopolymerization method, a plating method or a laser etching method, and the first and second electrochromic layers 232, 233 are made of a material selected from an anodic coloration, cathodic coloration or cathodic/anodic coloration transition metal oxide, and the first and second electrolytic layers 241, 242 are made of a liquid electrolyte or a solid electrolyte. If the first and second electrolytic layers 241, 242 have the functions of supplying ions as well as changing the complementary color change, the electrolytic layer is made of an electrochromic material as described in the second preferred embodiment. If the electrochromic layer 23 is made of a cathodic coloration material, then the complementary layer should be made of an anodic coloration material, and vice versa. Therefore, if the electrochromic layer 23 is colored, the complementary layer will also be colored, and if the electrochromic layer 23 is discolored, the complementary layer will also be discolored, and the first and second electrolytic layers 241, 242 are disposed at positions and directions corresponding to the first and second electrochromic layers 232, 233, and the plurality of first electrolytic layers 241 and the plurality of second electrolytic layers 242 are arranged with an interval apart from each other and disposed in each stack layer, such that after each electrochromic layer produces a photomask area, a better light shielding effect can be achieved.

Figure 22:
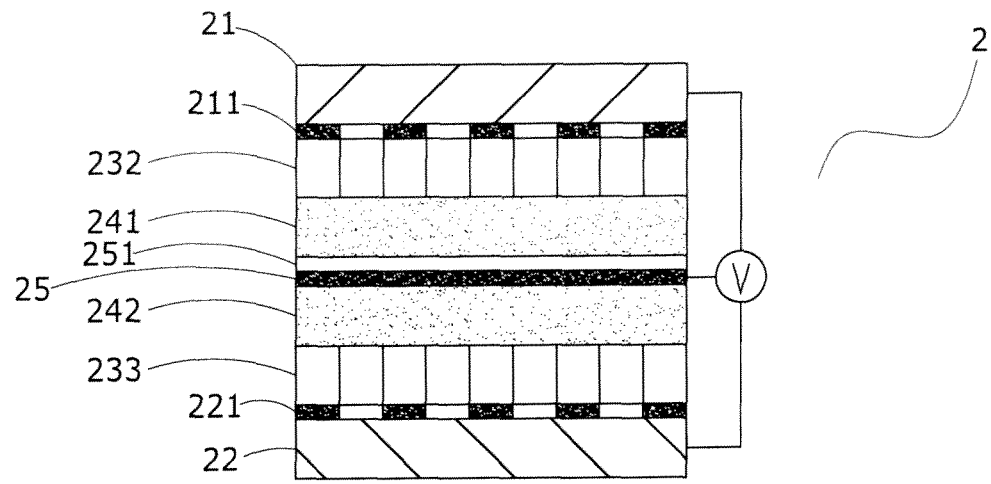
FIG. 22 is another perspective exploded view of a sixth preferred embodiment of the present invention.
Figure 23:
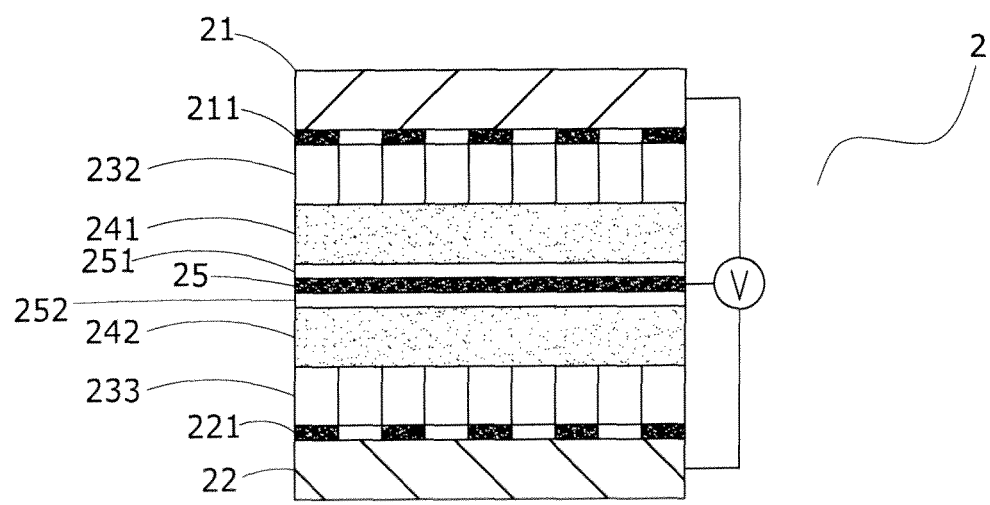
FIG. 23 is the other perspective exploded view of a sixth preferred embodiment of the present invention.

In the installation method in accordance with the sixth preferred embodiment, two electrochromic devices, the display device allows a viewer E to adjust the light shielding angle of the stereo image display to fit the viewing angle of the viewer E, so that a plurality of first electrochromic layers 232 are disposed in a first arrangement direction and arranged with an interval apart from each other, and a plurality of second electrochromic layers 233 are disposed in a second arrangement direction and arranged with an interval apart from each other, and the first arrangement direction and the second arrangement direction are preferably perpendicular to each other, and each of the first electrochromic layers 232 and the second electrochromic layers 233 produces a plurality of photomask areas arranged with an interval apart from each other according to the voltage. It is noteworthy to point out that the third transparent conducting layer 25 is the upper surface, or lower surface of a third transparent substrate having a third transparent conducting element 251. The third transparent conducting layer 25 can also be the upper surface of a third transparent substrate having a third transparent conducting element 251 and the lower surface of a third transparent substrate having a fourth transparent conducting element 252 to drive the first electrochromic layers 232 to produce a color change according to an electric conduction of the first transparent conducting element 211 and the third transparent conducting element 251, and the second electrochromic layer 233 produces a color change according to an electric conduction of the second transparent conducting element 221 and the fourth transparent conducting element 252, as shown in FIG. 22 and FIG. 23.

In the principle of operating the display device having a sensing element (not shown in the figure) and a control element (not shown in the figure), the sensing element and the control element are electrically coupled to each other, wherein the sensing element can be a gyroscope, and the control element is electrically coupled to the first transparent conducting element 211, the second transparent conducting element 221 and the third transparent conducting layer 25, and the sensing element is provided for sensing a rotating direction (such as a horizontal turn or a vertical turn) of the display device, and whose sensing signal is transmitted to the control element, and the control element switches the voltage of the first and second transparent conducting elements 211, 221, and the third transparent conducting layer 25, so as to change the state and color of the first electrochromic layer 232 and the second electrochromic layer 233. For example, when the image display unit 1 disposed in the first arrangement direction is aligned precisely at the viewer E, the first electrochromic layers 232 disposed in the first arrangement direction are colored, such that after an image of the image display unit 1 is passed through the first electrochromic layers 232 to form a parallax barrier, a stereo image is formed in the first arrangement direction. When the image display unit 1 disposed in the second arrangement direction is aligned precisely at the viewer E instead, the control element controls and switches the voltage of the first and second transparent conducting elements 211, 221 and the transparent conducting layer 25 to change the states of the first electrochromic layer 232 and the first electrolytic layer 241, such that the originally colored first electrochromic layer 232 is discolored, and the second electrochromic layer 233 is colored. Therefore, after the image passes through the second electrochromic layers 233 to form the parallax barrier, the stereo image is formed in the second arrangement direction, If the viewer E wants to resume the planar image display, the viewer E simply controls and switches the voltage of the first and second transparent conducting elements 211, 221 and the third transparent conducting layer 25 to discolor the first and second electrochromic layers 232, 233, and the image display unit 1 will be switched from the stereo image display to the planar image display.

Figure 21:
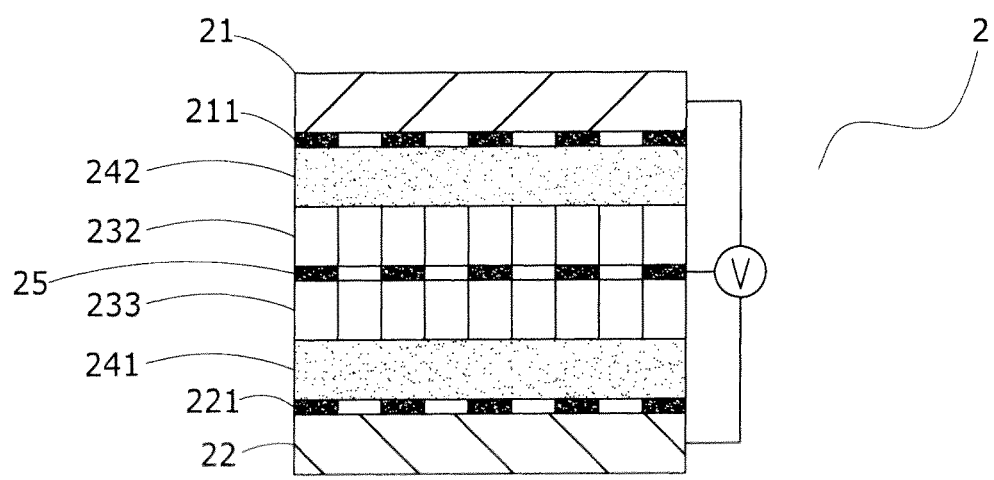
FIG. 21 is a perspective exploded view of a seventh preferred embodiment of the present invention.

With reference to FIG. 21 for an exploded view of a seventh preferred embodiment of the present invention, the difference of this preferred embodiment and the sixth preferred embodiment resides on that the positions of installing the first electrochromic layer 232 and the first electrolytic layer 241 are switched, and the positions of installing the second electrochromic layer 233 and the second electrolytic layer 242 are switched, so that the stereo image display can be adjusted according to the viewing angle to achieve the expected effects and properties, and the operating principle of the light shielding angle is the same as that of the sixth preferred embodiment, but the sequences of installing the aforementioned electrochromic devices in accordance with the sixth and seventh preferred embodiments are not necessarily the same, since each electrochromic layer is controlled by its voltage. It is applicable for the present invention, as long as the first arrangement direction and the second arrangement direction of the first electrochromic layer 232 and the second electrochromic layer 233 are different. Therefore, the sequence of forming the electrolytic layer and the electrochromic layer of the two superimposed structure can be the same or different, and both arrangements fall within the scope of the present invention.

In addition, the third transparent conducting element and the fourth transparent conducting element can be installed to cover the surface of the third transparent substrate (such as FIG. 20), or arranged with an interval apart from each other on the surface of the third transparent substrate (such as FIG. 21).

In summation of the description above, the present invention can improve over the prior art and comply with the patent application requirements, and thus is duly filed for patent application.

While the invention has been described by device of specific embodiments, numerous modifications and variations could be made thereto by those generally skilled in the art without departing from the scope and spirit of the invention set forth in the claims.

What is claimed is:
1. A 2D/3D image display device, comprising:
an image display unit, for displaying a planar image and a stereo image;
an image switching unit, coupled to a surface of the image display unit, and including:
a first transparent substrate, having a first transparent conducting element installed on a surface of the first transparent substrate;
a second transparent substrate, having a second transparent conducting element installed on a surface of the second transparent substrate corresponding to the first transparent substrate, and another surface of the second transparent substrate being combined with the image display unit;
a plurality of electrochromic layers, arranged with an interval apart from each other and disposed on a surface of the second transparent substrate, for producing a color change according to an electric conduction of the first and second transparent conducting elements; and
an electrolytic layer, installed between the electrochromic layers and the first transparent substrate.
2. The 2D/3D image switching display device of claim 1, wherein the image display unit is one selected from the collection of a liquid crystal display (LCD), a plasma display panel (PDP), a surface conduction electron-emitter display

(SED), a field emission display (FED), a vacuum fluorescent display (VFD), an organic light-emitting diode (OLED) or an electronic paper (e-Paper).

3. The 2D/3D image switching display device of claim 1, wherein the first transparent substrate and the second transparent substrate are made of a material selected from the collection of plastic, polymer plastic and glass or a plastic polymer selected from the collection of resin, polyethylene terephthalate (PET), polycarbonate (PC), polyethylene (PE), polyvinyl chloride (PVC), poly propylene (PP), polystyrene (PS), and polymethylmethacrylate (PMMA) or a mixture of the above.

4. The 2D/3D image switching display device of claim 1, wherein the electrochromic layers are installed on an upper surface of the second transparent substrate by a method selected from the collection of a sol-gel method, a sputtering method, a screen printing method, a coating method, a anodizing method, a photopolymerization method, a plating method and a laser etching method.

5. The 2D/3D image switching display device of claim 1, wherein the electrochromic layers are made of a material selected from the collection of an anodic coloration transition metal oxide, a cathodic coloration transition metal oxide and a cathodic/anodic coloration transition metal oxide or organic compounds.

6. The 2D/3D image switching display device of claim 5, wherein the electrochromic layers are made of an anodic coloration transition metal oxide selected from the collection of chromium oxide ($Cr_2O_3$), nickel oxide ($NiO_x$), Iridium oxide ($IrO_2$), manganese oxide ($MnO_2$), nickel hydroxide ($Ni(OH)_2$), tantalum pentoxide ($Ta_2O_5$) and ferric ferrocyanide ($Fe_4[Fe(CN)_6]_3$).

7. The 2D/3D image switching display device of claim 5, wherein the electrochromic layers are made of a cathodic coloration transition metal oxide selected from the collection of tungsten oxide ($WO_3$), molybdenum oxide ($MoO_3$), niobium oxide ($Nb_2O_3$), titanium oxide ($TiO_2$), strontium titanium oxide ($SrTiO_3$) and tantalum pentoxide ($Ta_2O_5$).

8. The 2D/3D image switching display device of claim 5, wherein the electrochromic layers are made of a cathodic/anodic coloration transition metal oxide selected from the collection of vanadium oxide ($V_2O_5$), rhodium oxide ($Rh_2O_3$) and cobalt oxide ($CoO_x$).

9. The 2D/3D image switching display device of claim 1, wherein the electrolytic layer is a liquid electrolyte or a solid electrolyte.

10. The 2D/3D image switching display device of claim 9, wherein the electrolytic layer is a solid electrolyte which is a proton exchange membrane selected from the collection of an ionomer membrane, an organic-inorganic hybrid membrane and a membrane based on polymer and oxo-acids.

11. The 2D/3D image switching display device of claim 10, wherein the electrolytic layer is a proton exchange membrane which is a polymerized perfluorosulfonic acid (PFSA) membrane.

12. The 2D/3D image switching display device of claim 1, wherein the first transparent conducting elements installed on a lower surface of the first transparent substrate are arranged with an interval apart from each other and in the same arrangement direction of the electrochromic layers, and the arrangement direction is a horizontal arrangement direction or a vertical arrangement direction.

13. The 2D/3D image switching display device of claim 1, wherein the second transparent conducting elements are arranged with an interval apart from each other on an upper surface of the second transparent substrate and in the same arrangement direction of the electrochromic layers, and the arrangement direction is a horizontal arrangement direction or a vertical arrangement direction.

14. The 2D/3D image switching display device of claim 1, wherein the first transparent conducting elements are arranged with an interval apart from each other on a lower surface of the first transparent substrate, and the second transparent conducting elements are arranged with an interval apart from each other on an upper surface of the second transparent substrate, and the first and second transparent conducting elements are arranged in the same arrangement direction of the electrochromic layers, and the arrangement direction is a horizontal arrangement direction or a vertical arrangement direction.

15. The 2D/3D image switching display device of claim 1, wherein the electrolytic layers are arranged with an interval apart from each other and between the first transparent conducting element and the electrochromic layers in the same arrangement direction of the electrochromic layers, and the arrangement direction is a horizontal arrangement direction or a vertical arrangement direction.

16. The 2D/3D image switching display device of claim 15, wherein the electrolytic layers are electrochromic layers made of a material selected from an anodic coloration transition metal oxide, a cathodic coloration transition metal oxide and a cathodic/anodic coloration transition metal oxide or organic compounds.

17. The 2D/3D image switching display device of claim 16, wherein the electrochromic layers are anodic coloration transition metal oxides selected from the collection of chromium oxide ($Cr_2O_3$), nickel oxide ($NiO_x$), Iridium oxide ($IrO_2$), manganese oxide ($MnO_2$), nickel hydroxide $Ni(OH)_2$, tantalum pentoxide ($Ta_2O_5$) and ferric ferrocyanide ($Fe_4[Fe(CN)_6]_3$).

18. The 2D/3D image switching display device of claim 16, wherein the electrochromic layers are made of a cathodic coloration transition metal oxide selected from the collection of tungsten oxide ($WO_3$), molybdenum oxide ($MoO_3$), niobium oxide ($Nb_2O_3$), titanium oxide ($TiO_2$), strontium titanium oxide ($SrTiO_3$) and tantalum pentoxide ($Ta_2O_5$).

19. The 2D/3D image switching display device of claim 16, wherein the electrochromic layers are made of a cathodic/anodic coloration transition metal oxide selected from the collection of vanadium oxide ($V_2O_5$), rhodium oxide ($Rh_2O_3$) and cobalt oxide ($CoO_x$).

20. The 2D/3D image switching display device of claim 1, further comprising a protective layer between a first transparent conducting element and a electrolytic layer, and the protective layer is made of a material selected from the collection of silicon dioxide ($SiO_2$), aluminum oxide ($Al_2O_3$), tetramethyldisiloxane (TMDSO, $C_4H_{14}OSi_2$), or other carbon-silicon-oxide layer.

21. The 2D/3D image switching display device of claim 1, further comprising a protective layer between a plurality of electrochromic layers and an electrolytic layer, and the protective layer is made of a material selected from the collection of silicon dioxide ($SiO_2$), aluminum oxide ($Al_2O_3$), tetramethyldisiloxane (TMDSO, $C_4H_{14}OSi_2$) or other carbon-silicon-oxide layer.

22. A 2D/3D image switching display device, comprising:
an image display unit, for displaying a planar image and a stereo image;
an image switching unit, coupled to a surface of the image display unit, and including:
a first transparent substrate, having a first transparent conducting element installed on a surface of the first transparent substrate;

a second transparent substrate, having a second transparent conducting element installed on a surface of the second transparent substrate corresponding to the first transparent substrate, and another surface of the second transparent substrate being combined with the image display unit;

a plurality of electrochromic layers, arranged with an interval apart from each other and disposed on a lower surface of the first transparent substrate, for producing a color change according to an electric conduction of the first and second transparent conducting elements; and an electrolytic layer, installed between the electrochromic layers and the second transparent substrate.

23. The 2D/3D image switching display device of claim 22, wherein the image display unit is a liquid crystal display (LCD), a plasma display panel (PDP), a surface conduction electron-emitter display (SED), a field emission display (FED), a vacuum fluorescent display (VFD), an organic light-emitting diode (OLED) or an electronic paper (e-Paper).

24. The 2D/3D image switching display device of claim 22, wherein the first transparent substrate and the second transparent substrate are made of plastic, polymer plastic, glass or a plastic polymer selected from the collection of resin, polyethylene terephthalate (PET), polycarbonate (PC), polyethylene (PE), polyvinyl chloride (PVC), poly propylene (PP), polystyrene (PS), and polymethylmethacrylate (PMMA) or their mixture.

25. The 2D/3D image switching display device of claim 22, wherein the electrochromic layers are disposed on an upper surface of the first transparent substrate by a method selected from the collection of a sol-gel method, a sputtering method, a screen printing method, a coating method, a anodizing method, a photopolymerization method, a plating method and a laser etching method.

26. The 2D/3D image switching display device of claim 22, wherein the electrochromic layers are made of a material selected from the collection of an anodic coloration transition metal oxide, a cathodic coloration transition metal oxide and a cathodic/anodic coloration transition metal oxide.

27. The 2D/3D image switching display device of claim 26, wherein the electrochromic layers are made of the anodic coloration transition metal oxide selected from the collection of chromium oxide ($Cr_2O_3$), nickel oxide ($NiO_x$), Iridium oxide ($IrO_2$), manganese oxide ($MnO_2$), nickel hydroxide ($Ni(OH)_2$), tantalum pentoxide ($Ta_2O_5$) and ferric ferrocyanide ($Fe4[Fe(CN)_6]_3$).

28. The 2D/3D image switching display device of claim 26, wherein the electrochromic layers are made of a cathodic coloration transition metal oxide selected from the collection of tungsten oxide ($WO_3$), molybdenum oxide ($MoO_3$), niobium oxide ($Nb_2O_3$), titanium oxide ($TiO_2$), strontium titanium oxide ($SrTiO_3$) and tantalum pentoxide ($Ta_2O_5$).

29. The 2D/3D image switching display device of claim 26, wherein the electrochromic layers are made of a cathodic/anodic coloration transition metal oxide selected from the collection of vanadium oxide ($V_2O_5$), rhodium oxide ($Rh_2O_3$) and cobalt oxide ($CoO_x$).

30. The 2D/3D image switching display device of claim 22, wherein the electrolytic layer is a liquid electrolyte or a solid electrolyte.

31. The 2D/3D image switching display device of claim 30, wherein the electrolytic layer is a solid electrolyte and made of a proton exchange membrane selected from the collection of an ionomer, membrane, an organic-inorganic hybrid membrane or a membrane based on polymer and oxo-acids.

32. The 2D/3D image switching display device of claim 31, wherein the electrolytic layer made of the proton exchange membrane is a polymerized perfluorosulfonic acid (PFSA) membrane.

33. The 2D/3D image switching display device of claim 22, wherein the first transparent substrate further comprises the plurality of first transparent conducting elements installed on a lower surface of the first transparent substrate and arranged with an interval apart from each other, and in the same arrangement direction of the electrochromic layers, and the arrangement direction is a horizontal arrangement direction or a vertical arrangement direction.

34. The 2D/3D image switching display device of claim 22, wherein the second transparent substrate further comprises the plurality of second transparent conducting elements installed on an upper surface of the second transparent substrate and arranged with an interval apart from each other and in the same arrangement direction of the electrochromic layers, and the arrangement direction is a horizontal arrangement direction or a vertical arrangement direction.

35. The 2D/3D image switching display device of claim 22, wherein the first transparent substrate further comprises the plurality of first transparent conducting elements installed on a lower surface of the first transparent substrate, and the second transparent substrate further comprises the plurality of second transparent conducting elements installed on an upper surface of the second transparent substrate, and the first and second transparent conducting elements are in the same arrangement direction of the electrochromic layers, and the arrangement direction is a horizontal arrangement direction or a vertical arrangement direction.

36. The 2D/3D image switching display device of claim 22, wherein the plurality of electrolytic layers are arranged with an interval apart from each other and disposed between the second transparent conducting element and the electrochromic layers, and in the same arrangement direction of the electrochromic layers, and the arrangement direction is a horizontal arrangement direction or a vertical arrangement direction.

37. The 2D/3D image switching display device of claim 36, wherein the electrolytic layers are electrochromic layers made of a transition metal oxide selected from the collection of an anodic coloration transition metal oxide, a cathodic coloration transition metal oxide and a cathodic/anodic coloration transition metal oxide or organic compounds.

38. The 2D/3D image switching display device of claim 37, wherein the electrochromic layers are made of an anodic coloration transition metal oxide selected from the collection of chromium oxide ($Cr_2O_3$), nickel oxide ($NiO_x$), Iridium oxide ($IrO_2$), manganese oxide ($MnO_2$), nickel hydroxide ($Ni(OH)_2$), tantalum pentoxide ($Ta_2O_5$) and ferric ferrocyanide ($Fe_4[Fe(CN)_6]_3$).

39. The 2D/3D image switching display device of claim 37, wherein the electrochromic layers are made of a cathodic coloration transition metal oxide selected from the collection of tungsten oxide ($WO_3$), molybdenum oxide ($MoO_3$), niobium oxide ($Nb_2O_3$), titanium oxide ($TiO_2$), strontium titanium oxide ($SrTiO_3$) and tantalum pentoxide ($Ta_2O_5$).

40. The 2D/3D image switching display device of claim 37, wherein the electrochromic layers are made of a cathodic/anodic coloration transition metal oxide selected from the collection of vanadium oxide ($V_2O_5$), rhodium oxide ($Rh_2O_3$) and cobalt oxide ($CoO_x$).

41. The 2D/3D image switching display device of claim 22, further comprising a protective layer between a second transparent conducting element and an electrolytic layer, and the protective layer is made of a material selected from the collection of silicon dioxide ($SiO_2$), aluminum oxide ($Al_2O_3$), tetramethyldisiloxane (TMDSO, $C_4H_{14}OSi_2$), or other carbon-silicon-oxide layer.

42. The 2D/3D image switching display device of claim 22, further comprising a protective layer between a plurality of electrochromic layers and an electrolytic layer, and the protective layer is made of a material selected from the collection of silicon dioxide ($SiO_2$), aluminum oxide ($Al_2O_3$), tetramethyldisiloxane (TMDSO, $C_4H_{14}OSi_2$), or other carbon-silicon-oxide layer.

43. A 2D/3D image switching display device, comprising:
an image display unit, for displaying a planar image and a stereo image;
an image switching unit, coupled to a surface of the image display unit, and including:
a first transparent substrate, having a first transparent conducting element installed on a surface of the first transparent substrate;
a second transparent substrate, having a second transparent conducting element installed on a surface of the second transparent substrate corresponding to the first transparent substrate, and another surface of the second transparent substrate being combined with a surface of the image display unit;
a plurality of first electrochromic layers, arranged with an interval apart from each other and disposed on a lower surface of the first transparent substrate;
a plurality of second electrochromic layer, arranged with an interval apart from each other and disposed on an upper surface of the second transparent substrate, and in the same arrangement direction of the first electrochromic layers, and provided for producing a color change of the first and second electrochromic layers according to an electric conduction of the first and second transparent conducting elements; and
an electrolytic layer, installed between the first electrochromic layers and the second electrochromic layers.

44. The 2D/3D image switching display device of claim 43, wherein the image display unit is one selected from the collection of a liquid crystal display (LCD), a plasma display panel (PDP), a surface conduction electron-emitter display (SED), a field emission display (FED), a vacuum fluorescent display (VFD), an organic light-emitting diode (OLED) and an electronic paper (e-Paper).

45. The 2D/3D image switching display device of claim 43, wherein the first transparent substrate and the second transparent substrate are made of plastic, polymer plastic, glass or a plastic polymer selected from the collection of resin, polyethylene terephthalate (PET), polycarbonate (PC), polyethylene (PE), polyvinyl chloride (PVC), polypropylene (PP), polystyrene (PS) and polymethylmethacrylate (PMMA) or their mixture.

46. The 2D/3D image switching display device of claim 43, wherein the first electrochromic layers are disposed on a lower surface of the first transparent substrate, and the second electrochromic layers are disposed on an upper surface of the second transparent substrate by a method selected from the collection of a sol-gel method, a sputtering method, a screen printing method, a coating method, a anodizing method, a photopolymerization method, a plating method and a laser etching method.

47. The 2D/3D image switching display device of claim 43, wherein the first and second electrochromic layers are made of a material selected from the collection of anodic coloration, cathodic coloration and cathodic/anodic coloration transition metal oxides or organic compounds.

48. The 2D/3D image switching display device of claim 47, wherein the first and second electrochromic layers are made of an anodic coloration transition metal oxide selected from the collection of chromium oxide ($Cr_2O_3$), nickel oxide ($NiO_x$), Iridium oxide ($IrO_2$), manganese oxide ($MnO_2$), nickel hydroxide $Ni(OH)_2$, tantalum pentoxide ($Ta_2O_5$) and ferric ferrocyanide $Fe_4[Fe(CN)_6]_3$.

49. The 2D/3D image switching display device of claim 47, wherein the first and second electrochromic layers are made of a cathodic coloration transition metal oxide selected from the collection of tungsten oxide ($WO_3$), molybdenum oxide ($MoO_3$), niobium oxide ($Nb_2O_3$), titanium oxide ($TiO_2$), strontium titanium oxide ($SrTiO_3$) and tantalum pentoxide ($Ta_2O_5$).

50. The 2D/3D image switching display device of claim 47, wherein the first and second electrochromic layers are made of a cathodic/anodic coloration transition metal oxide selected from the collection of vanadium oxide ($V_2O_5$), rhodium oxide ($Rh_2O_3$) and cobalt oxide ($CoO_x$).

51. The 2D/3D image switching display device of claim 43, wherein the electrolytic layer is a liquid electrolyte or a solid electrolyte.

52. The 2D/3D image switching display device of claim 51, wherein the electrolytic layer is a solid electrolyte composed of a proton exchange membrane selected from the collection of an ionomer membrane, an organic-inorganic hybrid membrane and a membrane based on polymer and oxo-acids.

53. The 2D/3D image switching display device of claim 52, wherein the electrolytic layer is made of a proton exchange membrane which is a polymerized perfluorosulfonic acid (PFSA) membrane.

54. The 2D/3D image switching display device of claim 43, wherein the plurality of electrolytic layers are arranged with an interval apart from each other, disposed between the first and second electrochromic layers, and in the same arrangement direction of the first and second electrochromic layers, and the arrangement direction is a horizontal arrangement direction or a vertical arrangement direction.

55. The 2D/3D image switching display device of claim 43, further comprising a protective layer which is made of a material selected from the collection of silicon dioxide ($SiO_2$), aluminum oxide ($Al_2O_3$), tetramethyldisiloxane (TMDSO, $C_4H_{14}OSi_2$), or other carbon-silicon-oxide layer, disposed between a first transparent conducting element and a first electrolytic layer, and disposed between a second transparent conducting element and a second electrolytic layer.

56. The 2D/3D image switching display device of claim 43, further comprising a protective layer which is made of a material selected from the collection of silicon dioxide ($SiO_2$), aluminum oxide ($Al_2O_3$), tetramethyldisiloxane (TMDSO, $C_4H_{14}OSi_2$), or other carbon-silicon-oxide layer, disposed between a plurality of first electrochromic layers and a first electrolytic layer, and disposed between a plurality of second electrochromic layers and a second electrolytic layer.

* * * * *